(12) United States Patent
Vincent et al.

(10) Patent No.: US 12,321,928 B2
(45) Date of Patent: Jun. 3, 2025

(54) BLOCKCHAIN-IMPLEMENTED METHOD AND SYSTEM FOR ACCESS CONTROL ON REMOTE INTERNET-ENABLED RESOURCES

(71) Applicant: nChain Licensing AG, Zug (CH)

(72) Inventors: Stephane Vincent, Luxembourg (LU); Craig Steven Wright, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 18/676,195

(22) Filed: May 28, 2024

(65) Prior Publication Data
US 2024/0386420 A1    Nov. 21, 2024

Related U.S. Application Data

(63) Continuation of application No. 18/144,801, filed on May 8, 2023, now Pat. No. 12,026,703, which is a
(Continued)

(30) Foreign Application Priority Data

Jul. 29, 2016 (GB) ..................................... 1613176

(51) Int. Cl.
*G06Q 20/38* (2012.01)
*G06Q 20/08* (2012.01)
(Continued)

(52) U.S. Cl.
CPC ....... *G06Q 20/382* (2013.01); *G06Q 20/0855* (2013.01); *G06Q 20/145* (2013.01);
(Continued)

(58) Field of Classification Search
CPC ............. G06Q 20/382; G06Q 20/0855; G06Q 20/145; G06Q 20/3823; G06Q 20/308;
(Continued)

(56) References Cited

U.S. PATENT DOCUMENTS

2015/0039470 A1   2/2015  Crites
2015/0332395 A1*  11/2015 Walker ............... G06Q 20/3678
                                              705/69
(Continued)

FOREIGN PATENT DOCUMENTS

GB          2531828 A        5/2016
WO    WO-2017190794 A1 *  11/2017 ............. G06F 21/35

OTHER PUBLICATIONS

Christidis et al. "Blockchains and Smart Contracts for the Internet of Things", IEEE Access, Jun. 3, 2016, pp. 2292-2303 (Year: 2016).*

(Continued)

*Primary Examiner* — James D Nigh
(74) *Attorney, Agent, or Firm* — Tarolli, Sundheim, Covell & Tummino LLP

(57) ABSTRACT

The invention provides a blockchain-implemented control method and corresponding system(s). The invention may control access to an internet-enabled resource such as an IoT device that is provided with computing capabilities enabling it to communicate with other computer-based resources and interact with a distributed ledger such as a blockchain. In one embodiment, the invention provides a method for controlling the use of an internet-enabled resource comprising providing a first blockchain transaction comprising at least one output which is redeemable only by provision of at least: i) a secret value selected by a user; and ii) a signature associated with a resource provider; sending use-related information to the resource; generating a second blockchain transaction requesting at least the secret value; and modifying the second blockchain transaction to include the secret value.

19 Claims, 7 Drawing Sheets

Related U.S. Application Data continuation of application No. 16/320,963, filed as application No. PCT/IB2017/054430 on Jul. 21, 2017, now Pat. No. 11,669,832.

(51) Int. Cl.

| | | |
|---|---|---|
| *G06Q 20/14* | (2012.01) | |
| *G06Q 20/30* | (2012.01) | |
| *G06Q 30/0645* | (2023.01) | |
| *G06Q 50/10* | (2012.01) | |
| *G06Q 50/40* | (2024.01) | |
| *H04L 9/00* | (2022.01) | |
| *H04L 9/06* | (2006.01) | |
| *H04L 9/32* | (2006.01) | |

(52) U.S. Cl.
CPC ......... *G06Q 20/3823* (2013.01); *G06Q 50/10* (2013.01); *G06Q 50/40* (2024.01); *H04L 9/0637* (2013.01); *H04L 9/3247* (2013.01); *G06Q 30/0645* (2013.01); *G06Q 2220/00* (2013.01); *G06Q 2220/10* (2013.01); *H04L 9/50* (2022.05)

(58) Field of Classification Search
CPC .... G06Q 50/10; G06Q 50/40; G06Q 30/0645; G06Q 2220/00; G06Q 2220/10; H04L 9/0637; H04L 9/3247; H04L 9/50
USPC .......................................................... 705/64
See application file for complete search history.

(56) References Cited

U.S. PATENT DOCUMENTS

| | | | |
|---|---|---|---|
| 2016/0086175 | A1 | 3/2016 | Finlow-Bates et al. |
| 2016/0098723 | A1 | 4/2016 | Feeney |
| 2016/0162873 | A1 | 6/2016 | Zhou et al. |
| 2016/0162897 | A1 | 6/2016 | Feeney |
| 2016/0283941 | A1 | 9/2016 | Andrade |
| 2017/0080900 | A1* | 3/2017 | Huennekens ........ G05D 1/0088 |
| 2017/0109748 | A1 | 4/2017 | Kote |
| 2020/0266991 | A1* | 8/2020 | Waters ................. H04L 9/0891 |

OTHER PUBLICATIONS

Konstantinos Bitcoin multisig the hard way: Understanding raw P2SH multisig transactions', Dec. 20, 2014, 19 pages, (Year: 2014).*
Hill Bitcoin Payments and the Lightning Network, retrieved from https://blog.scottlogic.com/2016/06/16/bitcoin-redeem-scripts.html, Jun. 16, 2016, 11 pages (Year: 2016).*
Smith, "Technical Analysis of the Bitcoin cryptocurrency", Dec. 4, 2015, Bachelorbeit, Faculty of Engineering and Computer Science, Dept. of Computer Science, 2015, 104 pages (Year: 2015).*
BlockStack (BlockStack, a Bitcoin secured global name space for distribued storage, Jul. 16, 2016, 8 pages (Year: 2016).*
Antonopoulos, "Mastering Bitcoin—Unlocking Digital Cryptocurrencies," O'Reilly Media, Inc., Dec. 20, 2014, 282 pages.
Arcade City, "Homepage," retrieved Mar. 2, 2017, https://arcade.city/, 1 page.
Bloch, "Bitcoin: Bigger than the Internet," Medium, https://medium.com/@collegecrypto/bitcoin-bigger-than-the-internet-6aea2d48c9db, Dec. 14, 2014 [retrieved Mar. 8, 2019], 4 pages.
Chainside, "Homepage," Chainside Ltd, copyright 2015, https://www.chainside.net/, 3 pages.
Christidis et al., "Blockchains and Smart Contracts for the Internet of Things," IEEE Access 4(1):2292-2303, May 10, 2016.
Flavos et al., "Colored Coins," Bitcoin Wiki, https://en.bitcoin.it/wiki/Colored_Coins, Aug. 3, 2014 (last edited Nov. 2, 2015) [retrieved Mar. 8, 2019], 7 pages.
Galt, "Ethereum Prepares for Take Off," Cointelegraph, Jul. 20, 2015, https://cointelegraph.com/news/ethereum-prepares-for-take-off, 7 pages.
Gil-Pulgar, "The Driverless Car Will Require Bitcoin and the Blockchain Technology," Bitcoin News, Dec. 6, 2015, 4 pages.
Halftimepad et al., ",," Bitcoin StackExchange, Nov. 26, 2012, https://bitcoin.stackexchange.com/questions/5510/password-based-bitcoin-transactions, 2 pages.
Hill, James, "Bitcoin Payments and the Lightning Network", https://blog.scottlogic.com/2016/06/16/bitcoin-redeem-scripts.html, Jun. 16, 2016, 11 pages.
International Search Report and Written Opinion mailed Sep. 11, 2017, Patent Application No. PCT/IB2017/054430, 10 pages.
IT Taxi, "Homepage," copyright 2017 [retrieved Mar. 2, 2017], https://www.ittaxi.it/, 4 pages.
Komuves, "The Bitcoin protocol," Falkstenen AB, May 30, 2014, https://hsbp.org/tiki-download_wiki_attachment.php?attId=179, 47 pages.
Lucchesi, "BlockStack, a Bitcoin secured global name space for distributed storage," Ray on Storage Blog, Jul. 16, 2016, https://silvertonconsulting.com/blog/2016/07/16/blockstack-a-bitcoin-secured-global-name-space-for-distributed-storage/, 8 pages.
Nakamoto, "Bitcoin: A Peer-to-Peer Electronic Cash System," Bitcoin, Oct. 31, 2008, https://bitcoin.org/bitcoin.pdf, 9 pages.
Pour, "Bitcoin multisig the hard way: Understanding raw P2SH multisig transactions," Dec. 20, 2014, https://www.soroushjp.com/2014/12/20/bitcoin-multisig-the-hard-way-understanding-raw-multisignature-bitcoin-transactions/, 19 pages.
Satoshi et al., "Connection Limits," Bitcoin Forum, Aug. 9, 2010, https://bitcointalk.org/index.php?topic=741.0; prev_next=prev, 2 pages.
Smith, "Technical analysis of the Bitcoin cryptocurrency," Bachelorarbeit, Faculty of Engineering and Computer Science, Dept of Computer Science, Dec. 4, 2015, pages.
Tomasicchio, "Roman Vacation Bitcoin-Style: How to Book Italian Taxis With Crypto," Cointelegraph, Sep. 14, 2016, https://cointelegraph.com/news/roman-vacation-bitcoin-style-how-to-book-italian-taxis-with-crypto, 2 pages.
UK Commercial Search Report mailed Nov. 4, 2016, Patent Application No. 1613176.5, 6 pages.
UK IPO Search Report mailed Feb. 9, 2017, Patent Application No. 1613176.5, 5 pages.
Valenzuela, "Arcade City: Ethereum's Big Test Drive to Kill Uber," Cointelegraph, https://cointelegraph.com/news/arcade-city-ethereums-big-test-drive-to-kill-uber, Mar. 15, 2016 [retrieved Mar. 8, 2019], 3 pages.
Vorobyov et al., "How can I create a multi signature 2-of-3 transaction?," Bitcoin Stack Exchange, https://bitcoin.stackexchange.com/questions/3712/how-can-i-create-a-multi-signature-2-of-3-transaction, May 17, 2012 [retrieved Mar. 8, 2019], 8 pages.

* cited by examiner

Figure 1

| Transaction identifier | | | Tx1 |
|---|---|---|---|
| Version number | | | |
| Number of inputs | | | 1 |
| Input[0] (unlocking) | Previous transaction | Hash | Previous Tx |
| | | Output index | |
| | Length of signature script | | |
| | Signature script | | \<Alice's signature> \<Alice's public key> |
| | SIGHASH flag | | SIGHASH_ALL |
| | Sequence number | | |
| Number of outputs | | | 1 |
| Output[0] (locking) | Value | | S |
| | Length of public key script | | |
| | Public key script | | OP_HASH160 \<hash of umbrella> OP_EQUALVERIFY OP_HASH160 \<hash160(redeem script)> OP_EQUAL |
| Locktime | | | 0 |

| Redeem script | OP_2 \<Bob's public key> \<Taxi's public key 2> \<Alice's public key> OP_3 OP_CHECKMULTISIG |
|---|---|

Figure 2

| Transaction identifier | | | Tx2 |
|---|---|---|---|
| Version number | | | |
| Number of inputs | | | 1 |
| Input[0] (unlocking) | Previous transaction | Hash | Previous Tx |
| | | Output index | |
| | Length of signature script | | |
| | Signature script | | \<Bob's signature> \<Bob's public key> |
| | SIGHASH flag | | SIGHASH_ALL |
| | Sequence number | | |
| Number of outputs | | | 1 |
| Output[0] (locking) | Value | | *Few satoshis* |
| | Length of public key script | | |
| | Public key script | | OP_HASH160 \<hash160(redeem script)> OP_EQUAL |
| Locktime | | | 0 |

| Redeem script | OP_1 \<metadata(reference to $mess_1$)> \<Taxi's public key 3> OP_2 OP_CHECKMULTISIG |
|---|---|

Figure 3

| Transaction identifier | | | Tx3 |
|---|---|---|---|
| Version number | | | |
| Number of inputs | | | 1 |
| Input[0] (unlocking) | Previous transaction | Hash | Tx2 |
| | | Output index | 0 |
| | Length of signature script | | |
| | Signature script | | `<Taxi's signature 3> redeem script from Tx2` |
| | SIGHASH flag | | SIGHASH_ALL |
| | Sequence number | | |
| Number of outputs | | | 1 |
| Output[0] (locking) | Value | | *Few satoshis* |
| | Length of public key script | | |
| | Public key script | | `OP_DUP HASH160 <Bob's public key> OP_EQUALVERIFY OP_CHECKSIG` |
| Locktime | | | 0 |

Figure 4a

| | | | |
|---|---|---|---|
| Transaction identifier | | | Tx4 |
| Version number | | | |
| Number of inputs | | | 1 |
| Input[0] (unlocking) | Previous transaction | Hash | Previous Tx |
| | | Output index | 0 |
| | Length of signature script | | |
| | Signature script | | \<Taxi's signature 1\> \<Taxi's public key 1\> |
| | SIGHASH flag | | SIGHASH_ALL\|SIGHASH_ANYONECANPAY |
| | Sequence number | | |
| Input[1] (unlocking) | Previous transaction | Hash | Tx1 |
| | | Output index | 0 |
| | Length of signature script | | |
| | Signature script | | \<Taxi's signature 2\> |
| | SIGHASH flag | | |
| | Sequence number | | |
| Number of outputs | | | 2 |
| Output[0] (locking) | Value | | 3BTC |
| | Length of public key script | | |
| | Public key script | | OP_DUP HASH160 \<Bob's public key\> OP_EQUALVERIFY OP_CHECKSIG |
| Output[1] (locking) | Value | | 2BTC |
| | Length of public key script | | |
| | Public key script | | OP_DUP HASH160 \<Alice's public key\> OP_EQUALVERIFY OP_CHECKSIG |
| Locktime | | | 0 |

Figure 4b

| Transaction identifier | | | Tx4 |
|---|---|---|---|
| Version number | | | |
| Number of inputs | | | 1 |
| Input[0] (unlocking) | Previous transaction | Hash | Previous Tx |
| | | Output index | 0 |
| | Length of signature script | | |
| | Signature script | | \<Taxi's signature 1\> \<Taxi's public key 1\> |
| | SIGHASH flag | | SIGHASH_ALL\|SIGHASH_ANYONECANPAY |
| | Sequence number | | |
| Input[1] (unlocking) | Previous transaction | Hash | Tx1 |
| | | Output index | 0 |
| | Length of signature script | | |
| | Signature script | | \<Taxi's signature 2\> \<Alice's signature\> \<redeem script from Tx1\> \<umbrella\> |
| | SIGHASH flag | | SIGHASH_ALL |
| | Sequence number | | |
| Number of outputs | | | 2 |
| Output[0] (locking) | Value | | 3BTC |
| | Length of public key script | | |
| | Public key script | | OP_DUP HASH160 \<Bob's public key\> OP_EQUALVERIFY OP_CHECKSIG |
| Output[1] (locking) | Value | | 2BTC |
| | Length of public key script | | |
| | Public key script | | OP_DUP HASH160 \<Alice's public key\> OP_EQUALVERIFY OP_CHECKSIG |
| Locktime | | | 0 |

Figure 5

| Transaction identifier | | | TxR |
|---|---|---|---|
| Version number | | | |
| Number of inputs | | | 1 |
| Input (unlocking) | Previous transaction | Hash | Tx1 |
| | | Output index | 0 |
| | Length of signature script | | |
| | Signature script | | \<Taxi's signature 2\> \<Alice's signature\> redeem script from Tx1 |
| | SIGHASH flag | | SIGHASH_ALL |
| | Sequence number | | |
| Number of outputs | | | 1 |
| Output (locking) | Value | | 5BTC |
| | Length of public key script | | |
| | Public key script | | OP_DUP HASH160 \<Alice's public key\> OP_EQUALVERIFY OP_CHECKSIG |
| Locktime | | | 0 |

Figure 6

Provide, to a blockchain, a first blockchain transaction representing a deposit for access to or use of a vehicle, the first blockchain transaction comprising at least one output redeemable by provision of at least: a redeem script; a secret value selected by a user requesting access to or use of the vehicle; and signatures associated with any two of: a resource provider, the user, or the vehicle Receive use-related information of the user Generate a second blockchain transaction comprising an input having a first signature script signed with the signature associated with the vehicle Request the secret value Validate a modification of the first signature script of the input of the second blockchain transaction to include the secret value and the user's signature Unlock the vehicle for access or use by the user Redeem the output of the second blockchain transaction by providing the user's signature, the redeem script and the secret value

BLOCKCHAIN-IMPLEMENTED METHOD AND SYSTEM FOR ACCESS CONTROL ON REMOTE INTERNET-ENABLED RESOURCES

CROSS REFERENCE TO RELATED APPLICATIONS

This application is a continuation of U.S. patent application Ser. No. 18/144,801, filed May 8, 2023, entitled "BLOCKCHAIN-IMPLEMENTED METHOD AND SYSTEM FOR ACCESS CONTROL ON REMOTE INTERNET-ENABLED RESOURCES," which is a continuation of U.S. patent application Ser. No. 16/320,963, filed Jan. 25, 2019, entitled "BLOCKCHAIN-IMPLEMENTED METHOD AND SYSTEM FOR ACCESS CONTROL ON REMOTE INTERNET-ENABLED RESOURCES," which is a 371 National Stage of International Patent Application No. PCT/IB2017/054430, filed Jul. 21, 2017, which claims priority to United Kingdom Patent Application No. 1613176.5, filed Jul. 29, 2016, the disclosures of which are incorporated herein by reference in their entirety.

FIELD OF INVENTION

This invention relates generally to distributed ledger technology (including blockchain related technologies), and in particular for access to and use of a controlled resource via the blockchain. The invention is particularly suited for providing a secure system for enabling the access to and/or use of the resource. Aspects of the invention relate also to the Internet of Things (IoT). The invention may be suited for controlling an IoT device.

BACKGROUND OF INVENTION

In this document we use the term 'blockchain' for the sake of convenience and ease of reference because it is currently the most widely known term in this context. The term is used herein to include all forms of electronic, computer-based distributed ledgers, including consensus-based blockchains, alt-chains, sidechains, and transaction-chain technologies, public or private, permissioned, and un-permissioned ledgers, private or public ledgers, shared ledgers, and variations thereof.

A blockchain is an electronic ledger which is implemented as a computer-based decentralised, distributed system made up of blocks which in turn are made up of transactions. Each transaction includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be i) validated by the first node that receives the transaction—if the transaction is validated, the node relays it to the other nodes in the network; and ii) added to a new block built by a miner; and iii) mined, i.e., added to the public ledger of past transactions.

The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations fall within the scope of the invention.

Blockchain technology is most widely known for the use of cryptocurrency implementation. However, in more recent times, digital entrepreneurs have begun exploring both the use of the cryptographic security system Bitcoin is based on, and the data that can be stored on the Blockchain, to implement new systems.

One area of current interest and research is the use of the blockchain for the implementation of "smart contracts". These are computer programs designed to automate the execution of the terms of a contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token, which has no discernable meaning or value. The token thus serves as an identifier that allows the real-world item to be referenced.

The invention also relates to the use of a blockchain-implemented mechanism to control access to a resource. This resource can be an "internet of things (IoT)" device. IoT has been described by Wikipedia as "the network of physical devices, vehicles, buildings, and other items embedded with electronics, software, sensors, and network connectivity that enables these objects to collect and exchange data . . . . The IoT allows objects to be sensed and controlled remotely across existing network infrastructure."

The present invention is defined in the appended claims.

SUMMARY OF THE INVENTION

The invention may provide a blockchain-implemented control method and corresponding system(s). The invention may be arranged to control access to and/or use of an internet-enabled resource. The resource may be a device or system. It may, for example, be a vehicle. The vehicle may be provided with computing capabilities to enable it to communicate with other computer-based resources and/or interact with a distributed ledger. This distributed ledger may be a blockchain, such as, for example, the Bitcoin blockchain.

The invention may provide a method comprising the steps of:
  providing a first blockchain transaction comprising at least one output which is redeemable only by provision of at least:
    a secret value selected by a user; and
    a signature associated with a resource (e.g., vehicle) provider;
  sending use (e.g., journey) related information to the vehicle;
  generating a second blockchain transaction requesting at least the secret value; and
  modifying the second blockchain transaction to include the secret value.

By providing the above-described method, provision and use of a controlled resource (e.g., driverless vehicle) is enabled having the advantages of secure payment and tamper-proof record-keeping of transactions.

The use (e.g., journey) related information may be sent by the resource/vehicle provider in the form of a tokenised third blockchain transaction comprising either the information or a pointer thereto.

This provides the advantage of preventing third parties from accessing the information.

The method may further comprise a step of generating a fourth blockchain transaction comprising at least one output redeemable to return an amount of cryptocurrency underlying the tokenised third blockchain transaction to the resource/vehicle provider.

This enables the vehicle provider to regain the underlying cryptocurrency, providing the advantage of making provision of the resource/vehicle more cost-effective.

The second blockchain transaction may be generated by the resource/vehicle and the modification may be performed by the user.

This provides the advantage of increasing the automation and the efficiency of the invention.

The second blockchain transaction may comprise a first output relating to an amount payable to the resource/vehicle provider or controller, and a second output relating to an amount repayable to the user.

This enables part of the deposit to be returned to the user of the invention as change, thereby providing the advantage of increasing the user-friendliness of the technique.

The second blockchain transaction may comprise preventing means for preventing at least one output of the second blockchain transaction from being modified by the user. This provides the advantage of increasing the security associated with the invention.

The preventing means may take the form of a securing input to the second blockchain transaction comprising the sighash flag SIGHASH_ALL|SIGHASH_ANYONECANPAY.

This enables prevention of the outputs of the transaction from being modified while allowing modification of the inputs, thereby providing the advantage of increasing the security of the payment.

The securing input may comprise an amount of cryptocurrency provided by at least one of: the vehicle providers and/or an electronic wallet associated with the resource/vehicle.

This provides the advantage of increasing the automation of the invention.

The method may further comprise a step of generating a fifth blockchain transaction comprising at least one output redeemable to refund an amount of cryptocurrency associated with the first blockchain transaction responsive to non-use of the resource/vehicle.

This provides a mechanism for allowing a refund of at least part of the deposit when a user of the invention decides to cancel their use of the resource, thereby providing the advantage of further increasing the user-friendliness of the invention.

The method may further comprise the step of unlocking the resource/vehicle in response to validation of modification of the second blockchain transaction.

This provides the advantage of further increasing the security of the invention.

The method may further comprise the step of a user of the resource sending at least one confirmation message confirming accuracy of the use-related information, hashing said message and storing said hashed message in a distributed hash table.

The method may further comprise the step of hashing the use-related information and storing said hashed information in a distributed hash table.

These provide the advantage of providing a simple and tamper-proof mechanism for recording the communications and their content for potential future reference.

The method may further comprise the step of determining a number of users present in, or using, the resource and allowing or disallowing provision of the resource dependent on said number.

This provides the advantage of preventing advantage being taken of the invention.

The resource may be a vehicle, which may be a driverless car.

This provides the advantage of a driverless taxi service capable of providing secure payment mechanisms and tamper-proof record-keeping of transactions.

BRIEF DESCRIPTION OF THE DRAWINGS

These and other aspects of the present invention will be apparent from, and elucidated with reference to, the embodiment described herein. An embodiment of the present invention will now be described, by way of example only, and with reference to the accompany drawings, in which:

FIG. 1 shows a blockchain transaction adapted to provide a deposit payment for provision of a vehicle;

FIG. 2 shows a blockchain transaction adapted to communicate journey-related information;

FIG. 3 shows a blockchain transaction adapted to repay a vehicle provider;

FIGS. 4a and 4b show incomplete and complete versions, respectively, of a blockchain transaction adapted to provide payment and associated change for the vehicle;

FIG. 5 shows a blockchain transaction adapted to provide a refund to a user of the vehicle;

FIG. 6 shows a method for controlling access to a vehicle; and

DETAILED DESCRIPTION

Figure 7:
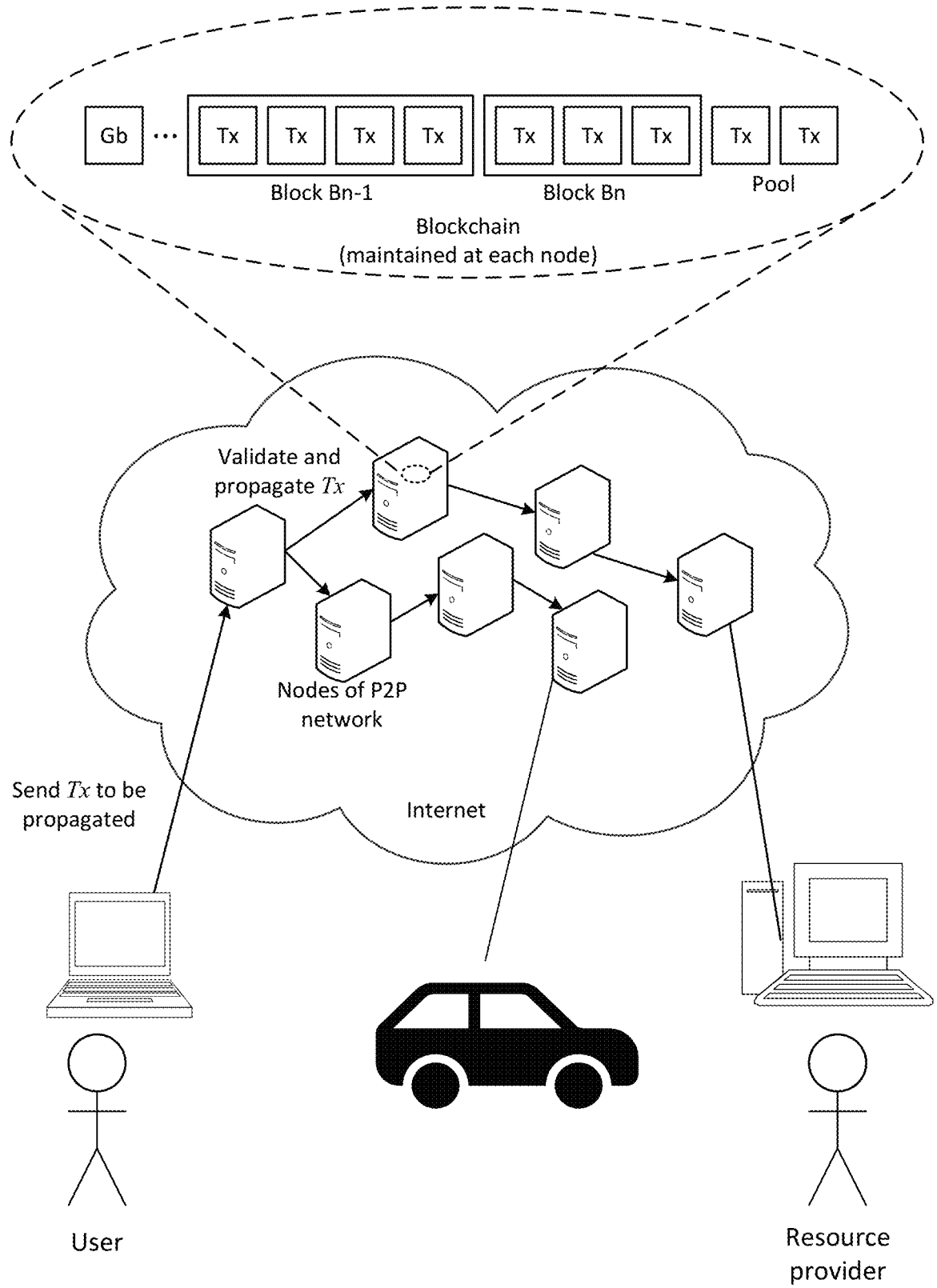
FIG. 7 shows a system comprising a vehicle, a resource provider, processors comprising memories, a blockchain, and a user.

In this illustrative scenario, we describe a method for controlling a driverless taxi via a blockchain. The use of the blockchain provides the inherent advantages provided by that technology. These advantages include a tamper proof record of events and increased security of currency exchange.

In this vehicle, we use the example of a taxi. However, the invention is not intended to be limited in this regard. The vehicle can be any IoT device or apparatus arranged for transportation of passengers and/or goods.

In our example, the taxi is an Internet of Things (IoT) device able to perform a range of possible functions such as resource-related functionality. A user's cryptographic key (PubKey) is communicated to the taxi for storage thereon or therein, in order to facilitate access. The taxi itself is capable of generating, storing, and communicating its own public and private keys, and signatures for signing blockchain transactions associated with provision of the driverless taxi service, and is able to send and receive wireless communications to users and providers of the taxi service. An IoT device is a programmable "Blockchain IOT Device (BID)" i.e., it is an internet-enabled device which is also able to monitor, interact with and publish to a blockchain network.

The invention also includes a communication protocol. In a preferred embodiment, this enables communication with the resource via a software application (app).

Alice is a prospective user of a taxi service provided and managed by Bob. Alice may otherwise be referred to as a 'user' or 'customer'. Bob may be referred to as a 'resource controller' or 'resource operator'. Alice provides to Bob a request for a taxi service which includes journey information comprising a pick-up location, a drop-off location, and the number of passengers that would like to be picked up by a taxi. This information may be sent in any suitable form, such as a text message, email, or as a tokenised transaction on the blockchain.

The communication between Alice and Bob may be initiated and/or controlled using a software application (app) which is downloaded and installed on Alice's computing device e.g., smartphone, tablet, laptop etc. The smartphone may provide certain pieces of information to Bob's server. For example, it may provide information relating to Alice's current location by using a GPS capability.

Having received the information from Alice, Bob estimates the cost of the journey, for example 5 Bitcoins (BTC), and communicates this estimate to Alice by any suitable means. Bob also determines the location of the nearest taxi to Alice's pick-up location and may choose to factor in the distance from that taxi to the pick-up location to his estimate. If Alice accepts the estimate provided by Bob, and the terms and conditions of the service (which are publicly accessible prior to initiation of the service and might be stored, for example, on Bob's website or social media pages), she communicates this acceptance to Bob by any suitable means, for example by text message, email, or phone call. Any one, or all, of these communications may be hashed and stored in a publicly accessible resource e.g., a distributed hash table for future reference for example in the circumstances where a dispute regarding a quoted estimate or journey details arises. These communications could also be recorded in further blockchain transactions.

Upon receipt of Alice's acceptance, Bob instructs the taxi to generate a blockchain transaction (Tx1, a deposit transaction) which includes an output having 2-of-3 multisig address using Alice's public key, Bob's public key, and the taxi's public key. Any blockchain transaction (Tx) signed with this 2-of-3 multisig address can only be redeemed by another transaction which includes an input having unlocking script which provides of any two of the specified signatures.

Alice chooses a secret value, such as a password, string, or number sequence or any other data type, which she keeps secret. Alice generates a first blockchain transaction, hereafter referred to as a "deposit transaction", comprising an output which spends an amount equal to Bob's estimate for the cost of the journey—in this example, 5 BTC. Alice signs transaction Tx1 with her digital signature, locks the transaction using a hash of her secret value, and sends the transaction to the multisig address generated by the taxi. Transaction Tx1 is broadcast to the blockchain.

The 5 BTC associated with the output of this transaction can only be spent by providing an unlocking script (in another transaction) which includes both Alice's private cryptographic key and two of the three signatures corresponding to the multisig address—in this example, any two of: Alice's signature; Bob's signature; and the taxi's signature. In this way, the 5 BTC of the deposit transaction are not spendable by Bob without Alice's key, and are not spendable by Alice because she is only able to provide one of the three signatures required. An example of the deposit transaction, Tx1, described above is shown in FIG. 1.

Bob then instructs the taxi to collect Alice and transport her to her destination. Bob may send the journey information to the taxi by any suitable means, such as via a software application capable of communicating with the taxi, or he may choose to create a tokenised blockchain transaction, hereafter referred to as "token transaction", capable of communicating journey-related information. The token transaction comprises an underlying value, which is usually chosen to be as small as possible because the value is not related to the purpose of the token transaction, and information embedded in the token transaction metadata. This embedded information contains either the journey information itself, or a pointer to the information, or a hashed version of the information or the pointer thereto. The pointer may take the form of a URL or a Torrent link directing the taxi to an online resource containing the journey information. An example of the token transaction is shown in FIG. 2, where the metadata is shown to contain a reference to "$mess_1$" in the redeem script of the transaction output: "$mess_1$" is a message generated by Bob which contains the journey information.

Bob then sends a message to the taxi, by any suitable means, upon confirmation of the token transaction's validation instructing the taxi to monitor the blockchain for the token transaction. The taxi uses its private cryptographic key to claim the output of the token transaction, thereby gaining access to the journey information sent by Bob.

Validation of one or more transactions includes checking that those transactions satisfy, among other criteria, syntactical correctness rules inherent in the blockchain code.

The taxi then proceeds to collect Alice at the pick-up location. The taxi may require Alice to send a message signed with her private key to unlock the taxi door. The taxi may use appropriate detection equipment, such as an infrared camera, to detect the number of passengers that enter the car and decide whether or not to provide the service depending on how that number compares to the number initially provided by Alice: for example if Alice provided journey information stating that there was to be only one passenger, and two or more passengers enter the taxi, the taxi may be configured to refuse to carry out the journey.

The taxi may ask Alice to confirm any of the journey information, such as the accuracy of the pick-up location and the destination, and any messages sent between Alice and the taxi may be hashed and stored in a DHT for future reference, as described above. The taxi may be configured only to commence the journey once one or more such confirmation messages are received and may be further configured to prevent opening of the doors after arrival at the destination until further confirmation messages are received.

The taxi then prepares up to three transactions: a return transaction; a proposed transaction, and a refund transaction. In one or more embodiments, the proposed transaction is the only transaction which is essential to the operation of the present invention. The taxi may generate one or more of these transactions upon completion of the journey.

The return transaction is configured to return the underlying value of the token transaction (shown in FIG. 2 to be a "few Satoshis") to Bob. An example of this return transaction can be seen in FIG. 3, which shows the "few Satoshis" in the output field of the transaction. However, even if Bob chooses to send the journey information in the form of a token transaction, he may not require or instruct the taxi to return the underlying value.

The proposed transaction, an example of which is shown in FIG. 4a, may be referred to as an incomplete transaction, or a transaction template. Upon completion of the journey, the taxi generates a proposed transaction having two inputs and at least one output. The first input is signed using a cryptographic signature and a public key associated with the taxi using sighash flag SIGHASH_ALL|SIGHASH_ANYONECANPAY, while the second input is signed only with a signature associated with the taxi. The first output corresponds to a payment to Bob for providing the service (in this case, the service actually cost only 3 BTC), and the second output (if required) corresponds to change for the service equal to the difference between the deposit transaction amount and the first output of the proposed transaction (in this case, 5 BTC deposit-3 BTC actual cost=2 BTC change) which is to be sent to Alice.

The purpose of the first input, signed using the above sighash flag, is to prevent Alice from modifying the output or outputs of the proposed transaction (by, for example, changing the value of the first output to 0 BTC for a free taxi ride) but allowing her to modify the second input in order to add necessary information. In this case, this necessary information is: Alice's signature, the redeem script from the deposit transaction, and Alice's secret value. These three items must be added to the signature script of the second input in order to successfully unlock the proposed transaction, paying Bob the 3 BTC for the service. These three items are shown in FIG. 4b, the completed version of the proposed transaction which Alice returns to the taxi. The taxi then submits this transaction to the Blockchain and may be configured to unlock and/or open the doors once the transaction is either validated or verified.

If Alice refuses to disclose her secret value, then by virtue of the deposit transaction being locked with a 2-of-3 multi-signature locking script, Bob may choose not to use his and/or the taxi's private keys to allow the 5 BTC of Alice's funds to be redeemed. Therefore, because the 5 BTC is irredeemable to anyone until Alice makes her secret value publicly known, Alice is motivated to be conduct transactions in the service honestly.

The taxi may generate a refund transaction allowing Alice to redeem the output of the deposit transaction if she decides not to use the service. This transaction is presented to Alice at the pick-up location. To regain her 5 BTC, both the taxi and Alice must present their signatures to the refund transaction's unlocking script. Instead of allowing the full 5 BTC amount to be refunded, Bob's terms and conditions may stipulate a subtracted fee to be paid to a public key associated with either the taxi or Bob, which would alter the refund transaction to have two outputs: the first output corresponding to a refund redeemable by Alice of 5 BTC minus the cancellation fee; and the second output corresponding to the fee redeemable by either the taxi or Bob. The taxi monitors the Blockchain and, before signing a proposed transaction, checks that no corresponding refund transaction has been spent.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises," and the like, does not exclude the presence of elements or steps other than those listed in any claim or the specification as a whole. In the present specification, "comprises" means "includes or consists of" and "comprising" means "including or consisting of." The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method for controlling a driverless vehicle via a blockchain, comprising:
   receiving a request for a driverless vehicle service from a user, the request including journey information;
   estimating a cost of a journey associated with the journey information;
   generating a deposit transaction on the blockchain that includes an output having a 2-of-3 multisig address using public keys of the user, a service provider, and the driverless vehicle;
   broadcasting the deposit transaction to the blockchain;
   creating a token transaction that includes the journey information or a pointer to the journey information;
   instructing the driverless vehicle to monitor the blockchain for the token transaction; and
   upon validation of the token transaction, the driverless vehicle collects the user.

2. A method according to claim 1, further comprising:
   generating, storing, and communicating public and private keys and signatures by the driverless vehicle.

3. A method according to claim 1, wherein the journey information comprises a pick-up location, a drop-off location, and a number of passengers to be collected by the driverless vehicle.

4. A method according to claim 1, wherein the deposit transaction is locked using a hash of a secret value provided by the user.

5. A method according to claim 1, wherein the token transaction comprises:
   an underlying value; and
   information embedded in token transaction metadata, which includes the journey information.

6. A method according to claim 1, wherein the driverless vehicle uses a private cryptographic key to claim an output of the token transaction and access the journey information.

7. A method according to claim 1, wherein the driverless vehicle is configured to send and receive wireless communications to and from the user and the service provider.

8. A method according to claim 1, further comprising:
   unlocking a door of the driverless vehicle upon receiving a message from the user, wherein the message is signed with a private key of the user.

9. A method according to claim 1, wherein the driverless vehicle is configured to use detection equipment to detect a number of passengers entering the driverless vehicle.

10. A method according to claim 1, further comprising:
    the driverless vehicle asking the user to confirm the journey information.

11. A method according to claim 1, further comprising:
    storing messages sent between the user and the driverless vehicle in a distributed hash table (DHT).

12. A method according to claim 1, wherein the driverless vehicle generates a proposed transaction upon completion of the journey, the proposed transaction having a first input and a second input and at least one output, and wherein the first input is signed using a cryptographic signature and a public key associated with the driverless vehicle.

13. A method according to claim 12, wherein the first input is signed using sighash flag SIGHASH_ALL|SIGHASH_ANYONECANPAY.

14. A method according to claim 12, wherein the user adds a signature, a redeem script from the deposit transaction, and a secret value to the second input to unlock the proposed transaction.

15. A method according to claim 1, wherein the driverless vehicle generates a refund transaction allowing the user to redeem the output of the deposit transaction if the user decides not to use the driverless vehicle service.

16. A method according to claim 15, wherein the refund transaction has two outputs: a first output corresponding to a refund redeemable by the user, and a second output corresponding to a cancellation fee redeemable by the service provider or the driverless vehicle.

17. A system for controlling a driverless vehicle via a blockchain, the system comprising:
the driverless vehicle;
the blockchain;
one or more processors; and
memory storing computer-executable instructions, that, as a result of execution by the one or more processors, cause the system to:
receive a request for a driverless vehicle service from a user, the request including journey information;
estimate a cost of a journey associated with the journey information;
generate a deposit transaction on the blockchain that includes an output having a 2-of-3 multisig address using public keys of the user, a service provider, and the driverless vehicle;
broadcast the deposit transaction to the blockchain;
create a token transaction that includes the journey information or a pointer to the journey information;
instruct the driverless vehicle to monitor the blockchain for the token transaction; and
upon validation of the token transaction, the driverless vehicle collects the user.

18. A system according to claim 17, wherein the driverless vehicle is configured to generate, store, and communicate public and private keys and signatures.

19. A system according to claim 17, wherein the journey information comprises a pick-up location, a drop-off location, and a number of passengers to be collected by the driverless vehicle.

* * * * *